W. H. BULLA.
AUTOMOBILE JACK.
APPLICATION FILED AUG. 14, 1916.
1,226,059.
Patented May 15, 1917.
2 SHEETS—SHEET 1.
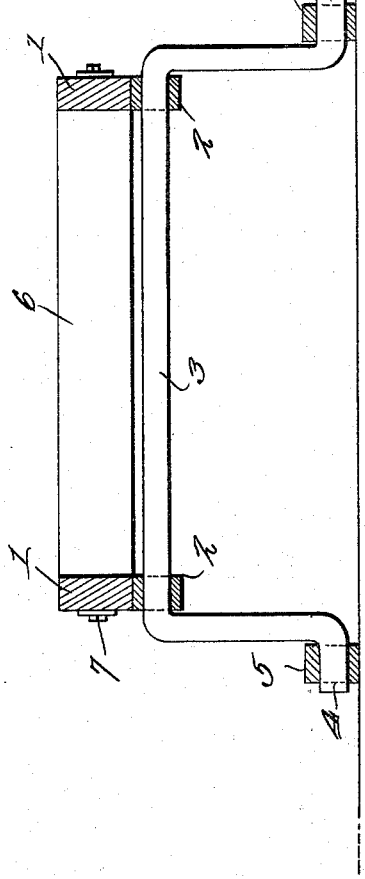
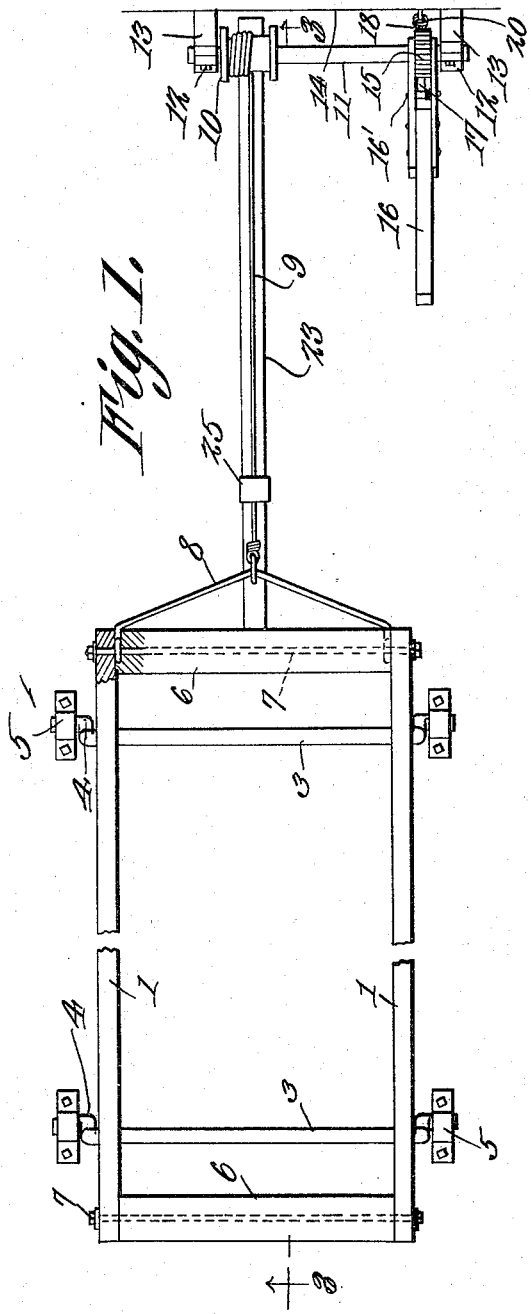
Witnesses
W. H. Bulla, Inventor,
by C. A. Snow & Co.
Attorneys.

W. H. BULLA.
AUTOMOBILE JACK.
APPLICATION FILED AUG. 14, 1916.
1,226,059.
Patented May 15, 1917.
2 SHEETS—SHEET 2.
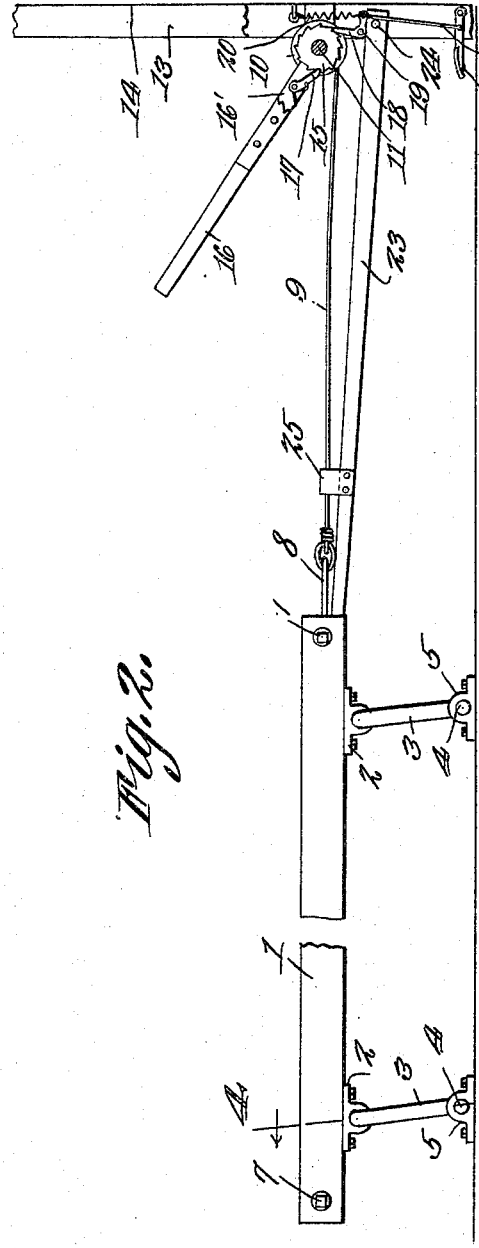
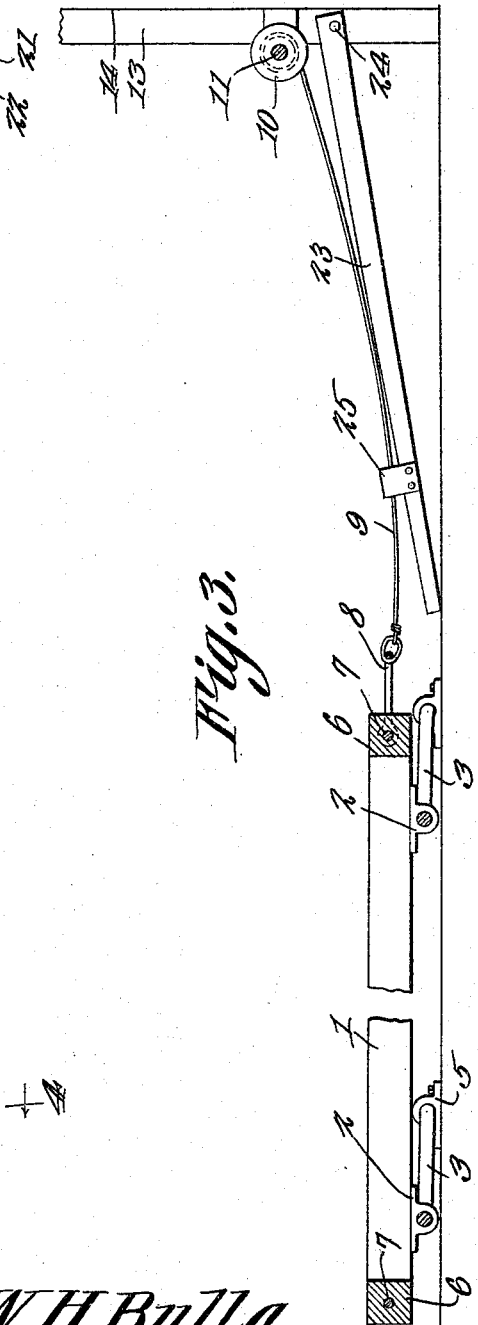
Witnesses
F. B. Wooden
R. L. Parker
W. H. Bulla, Inventor,
by C. A. Snow & Co.
Attorneys.

UNITED STATES PATENT OFFICE.

WILLIAM H. BULLA, OF KING CITY, MISSOURI.

AUTOMOBILE-JACK.

1,226,059.  Specification of Letters Patent.  Patented May 15, 1917.

Application filed August 14, 1916. Serial No. 114,829.

*To all whom it may concern:*

Be it known that I, WILLIAM H. BULLA, a citizen of the United States, residing at King City, in the county of Gentry and State of Missouri, have invented a new and useful Automobile-Jack, of which the following is a specification.

The present invention appertains to vehicle jacks and lifting devices, and aims to provide a novel and improved device for jacking up an automobile or other vehicle within a garage when not in use, to relieve the pneumatic tires of the weight of the machine, and to raise said tires above the floor which is generally greasy and gritty, whereby the lives of the tires are prolonged.

It is the object of the invention to provide a jack of the nature indicated which can be readily installed in a garage, barn or shed, and which can be operated in a simple yet effective manner for lifting the vehicle off of the floor and supporting it when not in use, it being an easy matter to let the vehicle down onto the floor whenever desired.

Another object of the invention is to provide an automobile jack of novel yet simple and inexpensive construction, which has advantageous details of construction to enhance the utility and efficiency thereof.

With the foregoing and other objects in view, which will appear as the description proceeds, the invention resides in the combination and arrangement of parts and in the details of construction, hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a plan view of the improved jack.

Fig. 2 is a side elevation illustrating the lift bars in raised position.

Fig. 3 is a longitudinal section taken on the line 3—3 of Fig. 1, showing the lift bars in lowered position.

Fig. 4 is a cross section taken on the line 4—4 of Fig. 1.

In carrying out the invention, there is provided a vertically movable supporting frame for the automobile or vehicle, embodying longitudinal substantially horizontal lift bars 1 preferably parallel with one another, and bearings 2 are secured to the lower edges of the bars 1 adjacent the ends thereof, and are mounted for rotation upon the yoke or cross portion of a pair of transverse arches 3. The yoke portions of said arches are journaled through the forward and rear pairs of bearings 2 and the terminals of said arches have outturned trunnions or spindles 4 journaled for rotation in forward and rear pairs of bearings 5 secured in any suitable manner upon the floor of the garage, whereby the arches 3 are mounted for swinging movement upon transverse axes to and from the floor. The frame has transverse end members or spacers 6 disposed between the ends of the bars 1, and transverse tie rods 7 extending through said end members 6 and ends of the bars, whereby to securely fasten the bars together.

When the bars 1 are moved rearwardly, they will be moved downwardly, as seen in Fig. 3, and when the bars are moved forwardly, they will be raised from the floor, as seen in Fig. 2. As a means for raising said lift bars to raise the vehicle, a V-shaped rod 8 is terminally engaged with the tie rod 7 at the rear end of the frame, and a cable 9 or other flexible element, such as a chain, or the like, is connected at one end to the angle of the rod 8, and its other end is attached to and adapted to be wound upon a transverse drum 10 secured upon a transverse shaft 11 having its terminals journaled in suitable bearings 12 secured to upright studs 13 of the rear wall or other suitable supporting structure 14 of the garage in rear of the jack. In order to manually rotate the shaft 11 for winding the cable upon the drum 10, a ratchet wheel 15 is secured upon the shaft 11, and a hand lever 16 has a fork 16' straddling the ratchet wheel and fulcrumed upon the shaft for oscillatory movement in a vertical plane, and a pawl or dog 17 is pivoted within the port 16' to engage the teeth of the ratchet wheel, whereby when the lever 16 is moved downwardly, said pawl will engage the ratchet wheel to rotate it therewith. The reverse rotation of the ratchet wheel and drum is prevented by an angular or L-shaped pawl or dog 18 having its elbow pivoted to one of the studs 13, as at 19, and a spring 20 is connected to one arm of the pawl 18 for forcing the other arm against the ratchet wheel so that the pawl 18 prevents the backward rotation of the ratchet wheel when not wanted. A link or rod 21 has one end connected to the first mentioned arm of the pawl 18, and has its other end pivoted to a treadle 22 pivoted to one of the studs 13 or other suitable support below the ratchet wheel and near the floor.

The contrivance is provided with means for limiting the upward movement of the bars 1, to stop the movement thereof before the arches 3 reach a vertical position, and for this purpose, a stop bar 23 is disposed longitudinally in rear of the jack proper, and has one end pivoted, as at 24, to one of the studs 13 or other suitable support, so as to project forwardly, and the bar 23 is provided adjacent its forward free end with a loop or other suitable member 25 upstanding therefrom and mounted slidably upon the cable 9, whereby the forward free end of the bar 23 will be lifted with the cable. The free end of the bar 23 is abuttable against the rear frame member 6 when the bars 1 are raised with the arches 3 near a vertical position, as seen in Fig. 2.

In operation, when the jack is not in use, the bars 1 are moved forwardly and downwardly, as seen in Fig. 3, and this enables the vehicle to be readily run over the jack. The vehicle can then be readily lifted from the floor by rotating the shaft 11 through the medium of the hand lever 16 and ratchet device, so that the cable 9 is wound upon the drum 10, thus pulling the bars 1 rearwardly, which will raise them through the medium of the arches 3, and the vehicle will therefore be lifted with the bars 1. As the bars 1 are thus raised, it will be evident that the cable 9 will be taut between the drum 10 and supporting frame, so that the loop member 25 in engaging the cable, will support and raise the bar 23 with the cable, in order that when the arches 3 approach a vertical position, and before they reach said vertical position, the rear member 6 will strike the free end of the bar 23, thus limiting and stopping the movement of the supporting frame, but the pawl 18 in engaging the ratchet wheel 15 will prevent the unwinding of the cable 9, to thereby hold the supporting frame in raised position. The vehicle will therefore be supported with its pneumatic tires relieved of the excessive pressure due to the weight of the machine, and the tires will also be out of contact with the grease and grit upon the floor which are more or less detrimental to pneumatic tires. When it is desired to lower the vehicle onto the floor, this can be easily accomplished by simply depressing the treadle 22, which will release the pawl 18, thereby permitting the ratchet wheel 15 and drum 10 to rotate, and the cable 9 to unwind from the drum. The supporting frame will therefore move forwardly and downwardly due to the weight of the vehicle imposed thereon, and this will allow the vehicle to gravitate onto the floor and move forwardly off of the jack. When the frame 1 is lowered, the cable 9 being slackened and lowered, will permit the free end of the bar 23 to drop onto the floor, whereby the entire device will be collapsed or prostrate.

Having thus described the invention, what is claimed as new is:—

1. A vehicle jack embodying a supporting frame mounted for movement upwardly and downwardly away from and toward a floor when moved longitudinally, a stop movable upwardly and downwardly relative to the floor into and out of operative position, the frame when moved upwardly being adapted to abut against the stop in operative position, said frame and stop being movable independently of one another, means for moving said frame longitudinally in one direction, and means whereby when said means is operated, the stop is raised to operative position for the abutment of the frame thereagainst.

2. A vehicle jack embodying a supporting frame mounted for movement upwardly and downwardly away from and toward a floor when moved longitudinally, a stop movable upwardly and downwardly relative to the floor into and out of operative position, a device for moving the frame longitudinally in one direction for raising it and including a flexible element connected to the frame, and means connecting said stop with the flexible element whereby when said device is operated the stop is raised to operative position for the abutment of the frame thereagainst.

3. A vehicle jack embodying a supporting frame, swinging members supporting it, a stop bar having one end pivotally supported remote from said frame and having its other end abuttable with the frame when it is raised, the last mentioned end of said bar being swingable downwardly when the frame is lowered, a device for pulling said frame longitudinally to raise it, and means whereby when said device is operated said bar is raised to frame stopping position.

4. A vehicle jack embodying a supporting frame, swinging members supporting it, a device for pulling said frame in one direction to raise it having a flexible element connected to the frame, a stop bar having one end pivotally supported remote from the frame, the free end of said bar being abuttable with the frame when it is raised, and means carried by said bar slidably engaging said cable whereby the bar is raised to frame stopping position when the frame is raised.

In testimony that I claim the foregoing as my own, I have hereto affixed my signature in the presence of two witnesses.

WILLIAM H. BULLA.

Witnesses:
GEORGE RYAN,
JULIUS LEVY.